Figures 1, 9:
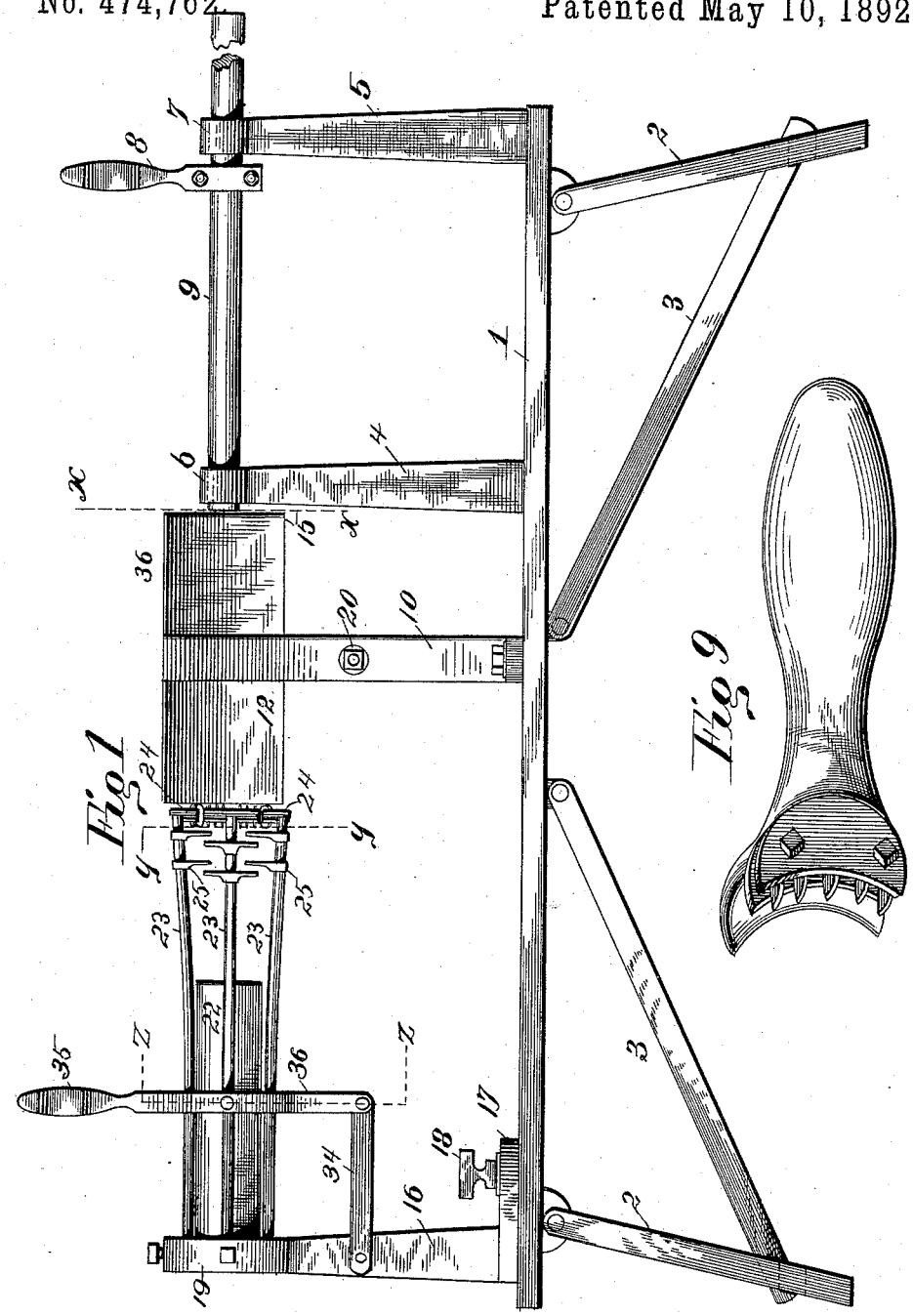

(No Model.) 2 Sheets—Sheet 1.

P. S. RICH.
MACHINE FOR PREPARING GREEN CORN FOR DOMESTIC USE.

No. 474,762. Patented May 10, 1892.

Witnesses
C. C. Burdine
J. B. Owens

Inventor
Peter S. Rich
per
R. Du Bois
his Attorney

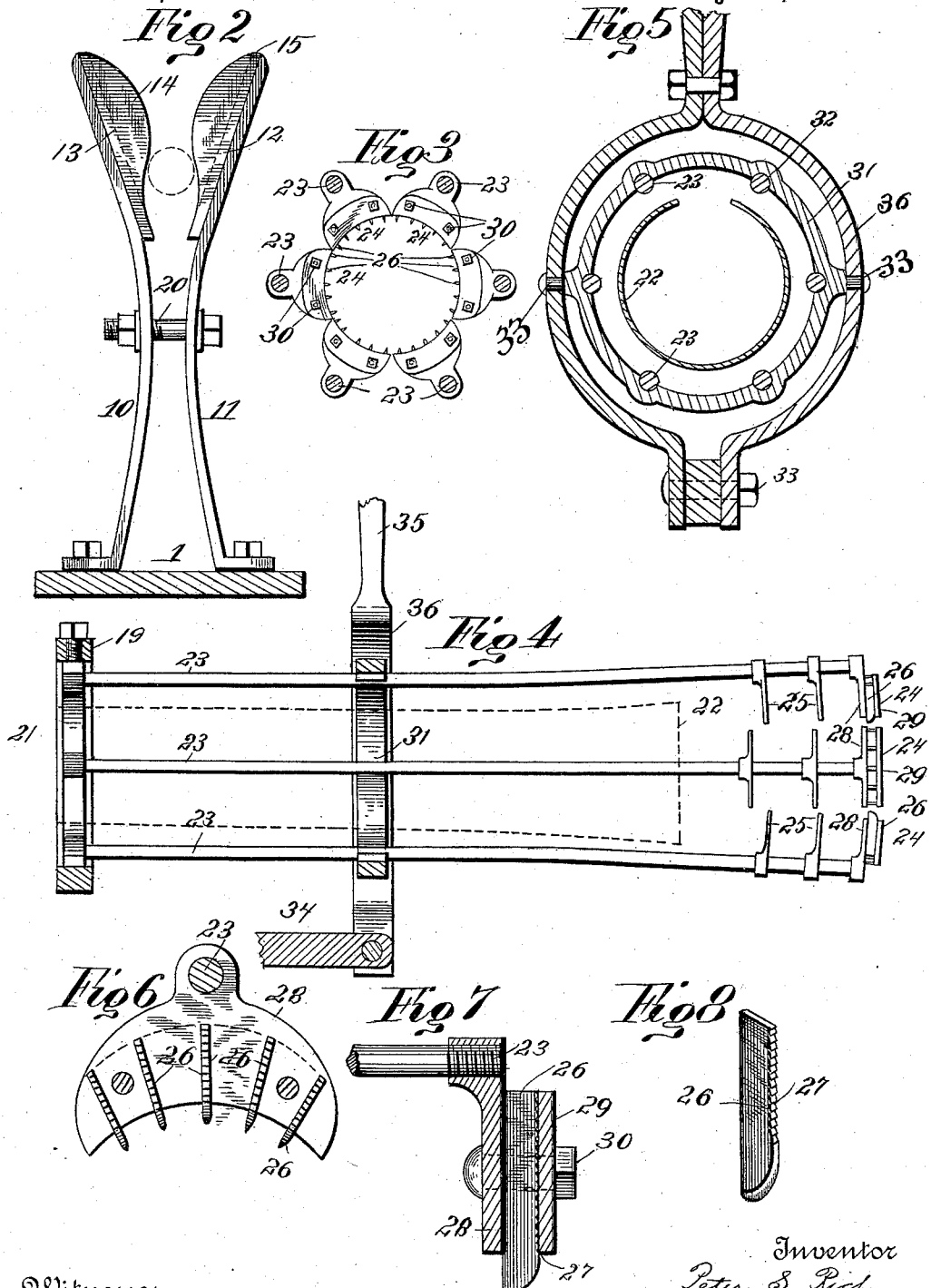

United States Patent Office.

PETER S. RICH, OF SPARTA, WISCONSIN.

MACHINE FOR PREPARING GREEN CORN FOR DOMESTIC USE.

SPECIFICATION forming part of Letters Patent No. 474,762, dated May 10, 1892.

Application filed October 20, 1891. Serial No. 409,281. (No model.)

*To all whom it may concern:*

Be it known that I, PETER S. RICH, a citizen of the United States, residing at Sparta, in the county of Monroe and State of Wisconsin, have invented certain new and useful Improvements in Machines for Preparing Green Corn for Domestic Use; and I do hereby declare the following to be a full, clear, and exact description of the invention, such as will enable others skilled in the art to which it appertains to make and use the same.

My invention relates to a machine for removing green corn from the cob, its object being to provide improved mechanism for extracting the nutritious portions or pulp of the kernels and leaving the hulls or skins on the cob.

To this end my invention consists in certain peculiar features of construction and combinations of parts, more fully described hereinafter, and pointed out in the claims.

Referring to the accompanying drawings, Figure 1 represents a side elevation of my device; Fig. 2, a section on the line X X, Fig. 1; Fig. 3, a transverse sectional view of the knife and scraper-arms, taken on line Y Y, Fig. 1; Fig. 4, a longitudinal section of the separator-frame; Fig. 5, a cross-section thereof, showing the means provided for expanding and contracting the arms; Figs. 6, 7, and 8, details of the incising-blades; Fig. 9, a modification in perspective of a hand implement.

The reference-figure 1 represents the body of my machine, upon which the operating parts are located. This table or body is supported by the pivoted legs 2, which are rigidly held in adjustment by the swinging braces 3, the whole constituting a folding table for convenience in transporting. Posts or standards 4 5 are rigidly secured to the table and are provided at their ends with enlarged portions 6 7, through which, by means of the handle 8, the plunger 9 is adapted to reciprocate. A hopper 36 is located in the middle of the table, and consists of the spring standards or supports 10 11, having side pieces 12 13 secured to them. End boards 14 15 are in turn secured to the side pieces, and a regulating-screw 20 connects the standards 10 11, whereby their spring power may be regulated. The corn is placed in this hopper and the plunger 9 pushed forward, the inner end engaging the end of the ear of corn and forcing it in engagement with the incising mechanism, which will now be described.

A standard 16, having a slotted base 17, which is provided with a thumb-screw 18, supports the mechanism. The standard 16 is provided with an enlarged end 19, in which is an opening 21. This opening is adapted to receive the tube 22, which is longitudinally slotted in order that it may adjust itself to any-sized cob. Located radially around this tube are the spring-arms 23, preferably six in number, to which are secured at their free ends the knives and scrapers 24 25, respectively. The knives 24 consist of the blades 26, having roughened or serrated edges 27, which are adapted to be clamped between the sections 28 29 of the knife-frame by means of the bolts 30, the cutting ends extending slightly beyond the frame in order that they may effectively slit or cut the tops of the kernels of corn. They may also be adjusted to make a cut of any depth by means of the hereinbefore-described bolts. The knives can be removed from the arms 23, for sharpening and repair, by means of their screw-threaded ends, which may be seen in Fig. 7. The scrapers 25 are located two on each of the arms 23 and extend slightly below the ends of the knives, being adapted to extract the pulp or nutritious portions of the corn after the kernels have been cut by the knives.

In order that the arms 23 may be adjusted to any-sized cob, I locate a sliding ring 31 around them, which has recesses 32 on its inner side conforming to the size of the arms 23, and adapted to receive them. This ring is rigidly secured to the circular handle by means of the bolts or rivets 33. This handle surrounds the ring and arms and is pivoted at its lower end to the swinging link 34, which is in turn connected to the standard 16.

It is evident that when the lever 35 is pushed forward by means of the handle-piece the arms and their attachment will be contracted, or if the motion is reversed they will be allowed to expand.

The modification shown in Fig. 9 represents a device adapted to be used by hand. The knives are located in front of the scrapers and are removably secured to the handle in substantially the same way as in the full-sized machine.

In using this implement the ear is held by one hand and the cutter in the other, and by means of the knives and scraper the pulp of the kernels extracted.

By referring to the drawings the operation of my device may be traced as follows: An ear of corn is placed in the hopper 36 and the plunger 9 when pushed forward will engage its inner end, forcing it endwise between the knives 24, which effectually split the hulls of the kernels. The scrapers then extract the pulp of the kernels, leaving the hulls on the cob, while the cob passes on through the tube 22 and out the other end of the machine to a basket or other suitable receptacle.

The knives and scrapers, with the devices for securing them, I term a "separating-frame," for it is herein that the nutritious portions are separated or removed from the ears of corn.

Having thus described my invention, what I claim as new therein, and desire to secure by Letters Patent, is—

1. A device for removing green corn from the cob, comprising an arm or handle, clamping-sections, removable cutting-blades located between the sections, means for securing the sections one to the other for fixing the blades, and relatively-fixed scrapers secured to the arm or handle, substantially as and for the purpose set forth.

2. In a machine for preparing corn, the herein-described separator-frame, comprising a series of spring-arms, clamping-sections secured to the arms, and cutting-blades located between the sections and provided with serrated edges for engaging the sections, substantially as set forth.

3. In a machine for preparing corn, the combination of a base separator-frame, a hopper having side pieces which are supported by spring-bars rising from the base, said bars being normally separated, an adjusting-bolt connecting the spring-bars, whereby the bars, and hence the sides of the hopper, are drawn together, and a plunger working in the hopper, substantially as described.

4. In a machine for preparing corn, the herein-described separator-frame, comprising a series of spring-arms provided with cutting-blades, a sliding ring fitting around the arms, and a pivoted operating-handle to which said ring is pivoted, substantially as set forth.

5. In a machine for preparing corn, a base, a post or support thereon provided with an opening, a longitudinally-slotted expansible tube fixed to the post around the opening, and arms also fixed to the post around the tube and provided with cutters, substantially as and for the purpose set forth.

In testimony whereof I affix my signature in presence of two witnesses.

PETER S. RICH.

Witnesses:
FRANK L. FRENCH,
ALBERT O. LEACH.